(12) United States Patent
Ciocanel et al.

(10) Patent No.: US 10,147,555 B2
(45) Date of Patent: Dec. 4, 2018

(54) STRUCTURAL SUPERCAPACITORS

(71) Applicant: THE ARIZONA BOARD OF REGENTS, A BODY CORPORATE ACTING FOR AND ON BEHALF OF NORTHERN ARIZONA UNIVERSITY, Flagstaff, AZ (US)

(72) Inventors: Constantin Ciocanel, Flagstaff, AZ (US); Cindy Browder, Flagstaff, AZ (US)

(73) Assignee: THE ARIZONA BOARD OF REGENTS, A BODY CORPORATE ACT FOR AND ON BEHALF OF, Flagstaff, AZ (US)

( * ) Notice: Subject to any disclaimer, the term of this patent is extended or adjusted under 35 U.S.C. 154(b) by 0 days.

(21) Appl. No.: 14/391,975

(22) PCT Filed: Apr. 18, 2013

(86) PCT No.: PCT/US2013/037217
§ 371 (c)(1),
(2) Date: Oct. 10, 2014

(87) PCT Pub. No.: WO2013/158910
PCT Pub. Date: Oct. 24, 2013

(65) Prior Publication Data
US 2015/0085423 A1 Mar. 26, 2015

Related U.S. Application Data

(60) Provisional application No. 61/635,128, filed on Apr. 18, 2012.

(51) Int. Cl.
H01G 11/34 (2013.01)
C08L 63/00 (2006.01)
C08G 59/50 (2006.01)
H01G 11/36 (2013.01)
(Continued)

(52) U.S. Cl.
CPC ............ *H01G 11/34* (2013.01); *C08G 59/50* (2013.01); *C08L 63/00* (2013.01); *H01G 11/36* (2013.01);
(Continued)

(58) Field of Classification Search
CPC .......... H01G 9/012; H01G 9/14; H01G 9/025; H01G 9/00; H01G 11/54; H01G 11/56; H01H 11/52
(Continued)

(56) References Cited

U.S. PATENT DOCUMENTS 6,849,362 B2 *  2/2005  Noh ................... H01M 10/0525
                                                429/303
8,804,312 B2 *  8/2014  Sugawara ............... C08L 65/00
                                                252/500

(Continued)

FOREIGN PATENT DOCUMENTS

JP    S59-179518 A    10/1984
JP    H04-041520 A    2/1992
(Continued)

OTHER PUBLICATIONS

International Search Report and Written Opinion of the International Searching Authority for International Application No. PCT/US2013/037217.
(Continued)

*Primary Examiner* — Nguyen Ha
(74) *Attorney, Agent, or Firm* — McDonnell Boehnen Hulbert & Berghoff LLP

(57) ABSTRACT

The present disclosure relates to solid polymer electrolytes, prepolymer compositions, and their uses in the preparation of capacitors.

16 Claims, 7 Drawing Sheets

(51) Int. Cl.
*H01G 11/56* (2013.01)
*H01G 11/40* (2013.01)
*H01G 11/52* (2013.01)
*H01G 11/68* (2013.01)
*H01G 11/78* (2013.01)
*H01G 11/86* (2013.01)
*H01M 2/16* (2006.01)

(52) U.S. Cl.
CPC ............ *H01G 11/40* (2013.01); *H01G 11/52* (2013.01); *H01G 11/56* (2013.01); *H01G 11/68* (2013.01); *H01G 11/78* (2013.01); *H01G 11/86* (2013.01); *H01M 2/1653* (2013.01); *Y02E 60/13* (2013.01); *Y10T 29/417* (2015.01)

(58) Field of Classification Search
USPC .................... 361/502, 503–504, 509–512
See application file for complete search history.

(56) References Cited

U.S. PATENT DOCUMENTS

| | | | |
|---|---|---|---|
| 2001/0023041 A1 | 9/2001 | Hayase et al. | |
| 2002/0102464 A1* | 8/2002 | Yoshida | H01G 9/038 429/300 |
| 2003/0152837 A1 | 8/2003 | Noh | |
| 2004/0126665 A1* | 7/2004 | Sun | H01M 10/052 429/303 |
| 2008/0209876 A1* | 9/2008 | Miller | G11C 13/0009 55/522 |
| 2012/0058399 A1 | 3/2012 | Cheng | |

FOREIGN PATENT DOCUMENTS

| | | |
|---|---|---|
| JP | 2000150308 A | 5/2000 |
| JP | 2005026539 A | 1/2005 |
| JP | 2006324318 A | 11/2006 |
| JP | 2007280912 A | 10/2007 |
| JP | 2010059258 A | 3/2010 |
| JP | 2010185051 A | 8/2010 |
| WO | 2008/140256 A1 | 11/2008 |

OTHER PUBLICATIONS

International Preliminary Report on Patentability for International Application No. PCT/US2013/037217.

Translation of Japanese Office Action dated Mar. 14, 2017 for related Japanese Application No. 2015-507187.

* cited by examiner

STRUCTURAL SUPERCAPACITORS

CROSS-REFERENCE TO RELATED APPLICATIONS

This application is a U.S. National Phase of International Application No. PCT/US2013/037217, filed Apr. 18, 2013, which claims priority to U.S. Provisional Application No. 61/635,128, filed Apr. 18, 2012, the disclosures of which are hereby incorporated by reference in their entireties.

BACKGROUND OF THE INVENTION

Field of the Invention

The present disclosure relates to solid polymer electrolytes, prepolymer compositions, and their uses in the preparation of capacitors.

Description of Related Art

The concept of structural capacitors was first introduced and conceptually proven in 2001 when a dielectric capacitor to be embedded in the casing of an electronic device was developed. This was done to minimize the volume of the device as capacitors are usually bulky and take up a large amount of space on a circuit board. This capacitor was made with electrodes of continuous carbon fiber and different types of paper as dielectric, all bonded together with an epoxy matrix, with capacitance per unit area having a maximum value of 1.23 $\mu F/m^2$ measured at 2 MHz, for a capacitor using a 0.04 mm thick writing paper as dielectric. Research efforts have continued since, with researchers reporting further developments on the structural capacitors with different types and numbers of layers of dielectric materials used. These structural capacitors exhibited mass and/or volume savings, but did not perform the individual functions as well as the conventional capacitor or composite material.

BRIEF SUMMARY OF THE INVENTION

An ideal structural electric double layer capacitors (EDLC) offers more storage than a traditional capacitor and higher power than a battery, while simultaneously being able to withstand mechanical loading. Thus, for a newly developed capacitor, leakage and equivalent series resistance (ESR) is evaluated in addition to capacitance, power and energy. Leakage resistance is an indicator of how well a capacitor holds the charge once disconnected from a power source. Ideally, a capacitor should have infinite leakage resistance. ESR, on the other hand, is indicative of the tendency of the supercapacitor to resist charging or discharging. Ideally, a supercapacitor should have zero ESR. Accordingly, such an EDLC may be used as a structural component as well as a power storage component in applications such as casings for electronic devices, car panels, interlayers of wind turbine blades, etc.

In broad aspect, the present disclosure relates to carbon fiber based power storage composite materials, EDLCs. These power storage composites show desirable higher leakage resistance values. In addition, the mechanical properties achieved for these power storage composite are in the same order of magnitude to those of a regular carbon fiber composites. For example, the EDLCs of the disclosure show the ultimate tensile strength, modulus of elasticity, flexural strength and flexural modulus of elasticity of about 58%, 69%, 94% and 67% of the regular composite values, respectively.

Thus, in one aspect, the disclosure provides solid polymer electrolytes comprising a polymer and an ion salt, wherein the polymer is an epoxy comprising a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof, and a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof; and wherein the ion salt is a lithium, a magnesium, or an ammonium salt.

In another aspect, the disclosure provides prepolymer compositions comprising an ion salt selected from the group consisting of a lithium, a magnesium, and an ammonium salt; a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof; and a solvent.

In another aspect, the disclosure provides capacitors comprising a first carbon fiber electrode, a second carbon fiber electrode, a solid polymer electrolyte as described herein, and a separator layer, wherein the separator layer is disposed between the first carbon fiber electrode and second carbon fiber electrode, the solid polymer electrolyte is disposed between the first carbon fiber electrode and the separator layer, and the solid polymer electrolyte is disposed between the second carbon fiber electrode and the separator layer.

In another aspect, the disclosure provides methods for preparing a capacitor comprising assembling a stack comprising a first carbon fiber electrode, a second carbon fiber electrode, a prepolymer composition as described herein, and a separator layer, wherein the separator layer is disposed between the first carbon fiber electrode and second carbon fiber electrode, and wherein the prepolymer composition is disposed between the first carbon fiber electrode and the separator layer, and the prepolymer composition is disposed between the second carbon fiber electrode and the separator layer; and compressing the stack.

In another aspect, the disclosure provides methods for preparing a solid polymer electrolyte comprising adding to a composition comprising a solvent, an ion salt selected from the group consisting of a lithium, a magnesium, and an ammonium salt, and a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof, a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof; and heating the composition.

Specific embodiments of the present invention will become evident from the following detailed description of certain embodiments, examples, and the claims.

DETAILED DESCRIPTION OF THE INVENTION

One aspect of the disclosure provides solid polymer electrolytes comprising a polymer and an ion salt, wherein the polymer is an epoxy comprising a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof, and a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris (2-aminoethyl)amine, ethylenediamine, or a mixture thereof; and wherein the ion salt selected from the group consisting of a lithium, a magnesium, and an ammonium salt.

Figure 1A:
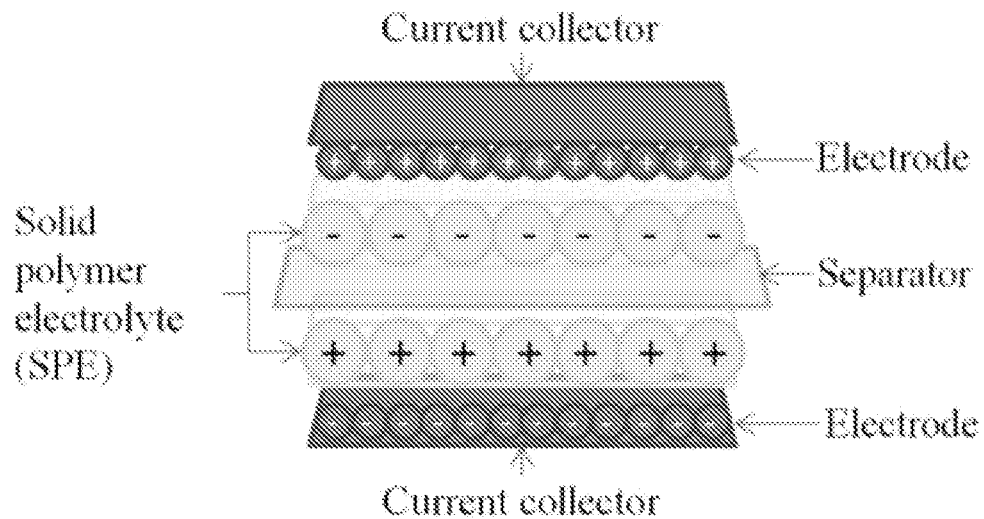
FIG. 1A shows a schematic of an EDLC and its components.
Figure 1B:
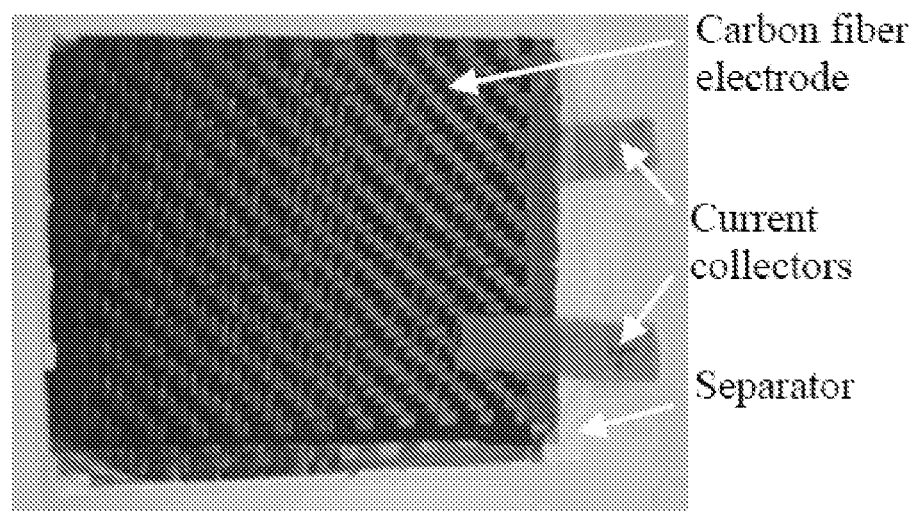
FIG. 1B shows a structural EDLC sample.

The morphology of a typical ELDC, together with a sample structural supercapacitor is shown in FIG. 1. The separator may block electrical flow, but more generally allow ions to pass through. The electrolyte is a mix between an ion reach salt and a polymer blend. In regular EDLCs, the electrolyte is a liquid or gel, while in the proposed structural EDLC the electrolyte is solid. When a voltage is applied across electrodes, the positive ions will gravitate toward the negative electrode and the negative ions will move toward the positive electrode, storing charge at the two electrolyte-electrode interfaces (hence the electric double layer capacitor label).

In one embodiment, the disclosure provides the solid polymer electrolyte wherein the bis-epoxide is selected from the group consisting of poly(ethylene glycol) bisglycidyl ether, resorcinol diglycidyl ether, polydimethyl siloxane bisglycidyl ether, and mixtures thereof.

In another embodiment, the solid polymer electrolyte of the disclosure is wherein the bis-epoxide is poly(ethylene glycol) bisglycidyl ether and one or more bis-epoxides selected from the group consisting of resorcinol diglycidyl ether, polydimethyl siloxane bisglycidyl ether, and mixtures thereof.

In particular embodiments, the solid polymer electrolyte of the disclosure as described above is wherein the bis-epoxide is poly(ethylene glycol) bisglycidyl ether and resorcinol diglycidyl ether. In other particular embodiments, the epoxy is prepared from a composition comprising poly (ethylene glycol) bisglycidyl ether and resorcinol diglycidyl ether in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In other embodiments, the solid polymer electrolyte of the disclosure as described above is wherein the bis-epoxide is poly(ethylene glycol) bisglycidyl ether and polydimethyl siloxane bisglycidyl ether. In particular embodiments, the epoxy is prepared from a composition comprising poly (ethylene glycol) bisglycidyl ether and polydimethyl siloxane bisglycidyl ether in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the solid polymer electrolyte of the disclosure as described above is wherein the bis-epoxide is poly(ethylene glycol) bisglycidyl ether and bisphenol A diglycidyl ether. In certain embodiments, the epoxy is prepared from a composition comprising poly (ethylene glycol) bisglycidyl ether and bisphenol A diglycidyl ether in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In other embodiments, the solid polymer electrolyte of the disclosure as described in any of the above embodiments is wherein the poly(ethylene glycol) bisglycidyl ether has a number-averaged molecular weight ($M_n$) of about 100 g/mol to about 1000 g/mol; or about 300 g/mol to about 1000 g/mol; or about 300 g/mol to about 700 g/mol; or about 400 g/mol to about 600 g/mol; or about 500 g/mol to about 550 g/mol.

In particular embodiments, the solid polymer electrolyte of the disclosure as described in any of the above embodiments is wherein the cross-linker comprises (i) 4,4'-methylenebiscyclohexaneamine and (ii) triethylenetetramine, tris (2-aminoethyl)amine, ethylenediamine, or a mixture thereof. In other particular embodiments, the cross-linker is 4,4'-methylenebiscyclohexaneamine and triethylenetetramine. In other particular embodiments, the cross-linker is 4,4'-methylenebiscyclohexaneamine and tris(2-aminoethyl) amine. In other particular embodiments, the cross-linker is 4,4'-methylenebiscyclohexaneamine and ethylenediamine.

In other particular embodiments of the solid polymer electrolyte of the disclosure as described above, the cross-linker comprises 4,4'-methylenebiscyclohexaneamine.

In other embodiments, the solid polymer electrolyte of the disclosure as described in any of the above embodiments is wherein the ion salt is the lithium salt. Suitable lithium salt that can be used in the disclosure is lithium bromide, lithium chloride, and lithium iodide, lithium hexafluoroarsenate(V), lithium hexafluorophosphate, lithium bis(trifluoromethyl sulfonyl)imide, lithium borohydride, lithium dihydrogenphosphate, lithium tetrafluoroborate, lithium metaborate, lithium perchlorate, lithium thiophenolate, and lithium trifluoromethanesulfonate, or a mixture thereof. In particular embodiments, the lithium salt is lithium bis(trifluoromethyl sulfonyl)imide. The ion salt, including the lithium salt, may be present at a concentration of about 0.01 M to about 2.0 M; or about 0.1 M to about 1.5 M or about 0.1 M to about 1.0 M; or about 0.5 M to about 2.0 M; or about 0.5 M to about 1.5M; or about 0.5 M to about 1.0 M; or about 0.75 M to about 1.25 M.

In certain embodiments, the solid polymer electrolyte of the disclosure as described in any of the above embodiments further comprises a second polymer. Such polymer will be suitable in preparing a polymer blend. Exemplary polymers include, but are not limited to poly[dimethylsiloxane-co-methyl(3-hydroxypropyl)siloxane]-graft-poly(ethylene glycol) methyl ether, poly(dimethylsiloxane), hydroxy terminated, siloxane polymers, polyvinyl alcohol and its derivatives, and the like.

In one aspect, the disclosure provides prepolymer compositions comprising an ion salt selected from the group consisting of a lithium, a magnesium, and an ammonium salt; a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof; and a solvent.

In one embodiment, the prepolymer compositions of the disclosure is wherein the bis-epoxide is selected from the group consisting of poly(ethylene glycol) bisglycidyl ether, resorcinol diglycidyl ether, polydimethyl siloxane bisglycidyl ether, and mixtures thereof.

In other embodiments, the prepolymer of the disclosure is wherein the bis-epoxide is poly(ethylene glycol) bisglycidyl ether and one or more bis-epoxides selected from the group consisting of resorcinol diglycidyl ether, polydimethyl siloxane bisglycidyl ether, and mixtures thereof. In other embodiments, the prepolymer is where the bis-epoxide is poly(ethylene glycol) bisglycidyl ether and resorcinol diglycidyl ether. In certain embodiments, the poly(ethylene glycol) bisglycidyl ether and resorcinol diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In certain embodiments, the prepolymer of the disclosure is wherein the bis-epoxide is poly(ethylene glycol) bisglycidyl ether and polydimethyl siloxane bisglycidyl ether. In particular embodiments, the poly(ethylene glycol) bisglycidyl ether and polydimethyl siloxane bisglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In another embodiment, the prepolymer compositions of the disclosure is wherein the bis-epoxide is poly(ethylene glycol) bisglycidyl ether and bisphenol A diglycidyl ether. In certain embodiments, the poly(ethylene glycol) bisglycidyl ether and bisphenol A diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In certain embodiments, the prepolymer composition of the disclosure as described above is wherein the poly (ethylene glycol) bisglycidyl ether has a number-averaged molecular weight ($M_n$) of about 100 g/mol to about 1000 g/mol; or about 300 g/mol to about 1000 g/mol; or about 300 g/mol to about 700 g/mol; or about 400 g/mol to about 600 g/mol; or about 500 g/mol to about 550 g/mol.

In particular embodiments, the prepolymer composition of the disclosure as described above is wherein the ion salt is the lithium salt. Suitable lithium salts include lithium bromide, lithium chloride, and lithium iodide, lithium hexafluoroarsenate(V), lithium hexafluorophosphate, lithium bis(trifluoromethyl sulfonyl)imide, lithium borohydride, lithium dihydrogenphosphate, lithium tetrafluoroborate, lithium metaborate, lithium perchlorate, lithium thiophenolate, and lithium trifluoromethanesulfonate, or a mixture thereof. In other embodiments, the lithium salt is lithium bis(trifluoromethyl sulfonyl)imide.

In other particular embodiments, the prepolymer composition of the disclosure as described above where the lithium salt is present at a concentration of about 0.01 M to about 2.0 M; or about 0.1 M to about 1.5 M or about 0.1 M to about 1.0 M; or about 0.5 M to about 2.0 M; or about 0.5 M to about 1.5M; or about 0.5 M to about 1.0 M; or about 0.75 M to about 1.25 M.

In certain embodiments, the prepolymer composition of the disclosure as described in any of the above embodiments further comprises a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl) amine, benzene 1,2-diamine, triethylenetetramine, tris(2-aminoethyl)amine, ethylenediamine, or a mixture thereof.

In certain embodiments, the prepolymer composition of the disclosure as described in any of the above embodiments further comprises a cross-linker comprising (i) 4,4'-methylenebiscyclohexaneamine and (ii) triethylenetetramine, tris(2-aminoethyl)amine, ethylenediamine, or a mixture thereof. In particular embodiments, the cross-linker is 4,4'-methylenebiscyclohexaneamine and triethylenetetramine. In other particular embodiments, the cross-linker is 4,4'-methylenebiscyclohexaneamine and tris(2-aminoethyl)amine. In other particular embodiments, the cross-linker is 4,4'-methylenebiscyclohexaneamine and ethylenediamine.

In particular embodiments of the prepolymer of the disclosure as described above, the cross-linker comprises 4,4'-methylenebiscyclohexaneamine.

In particular embodiments, the prepolymer composition of the disclosure as described above is wherein the solvent is dimethyl carbonate, diethyl carbonate, propylene carbonate, ethylene carbonate, vinylene carbonate, methyl ethyl carbonate, dipropyl carbonate, butylene carbonate, dibutyl carbonate or a mixture thereof. In other embodiments, the solvent is propylene carbonate.

In particular embodiments, the prepolymer composition of the disclosure as described above further comprises one or more of a plasticizer. Exemplary plasticizers include, but are not limited to, sebacates, adipates, maleates, and dibutyl ester-based plasticizers.

In other embodiments, the prepolymer composition of the disclosure as described above further comprises a second polymer.

In certain embodiments, the prepolymer composition of the disclosure further comprises a solid additive. Suitable solid additives include, but are not limited to carbon nanotubes, aluminum oxide nanoparticles, and the like. In a particular embodiment, the prepolymer composition of the disclosure further comprises aluminum oxide nanoparticles.

In one aspect, the disclosure provides capacitors comprising a first carbon fiber electrode, a second carbon fiber electrode, a solid polymer electrolyte as described in any of the above embodiment, and a separator layer, wherein the separator layer is disposed between the first carbon fiber electrode and second carbon fiber electrode, the solid polymer electrolyte is disposed between the first carbon fiber electrode and the separator layer, and the solid polymer electrolyte is disposed between the second carbon fiber electrode and the separator layer.

In one embodiment of the capacitor of the disclosure, each carbon fiber electrode is an activated carbon fiber electrode or has carbon nanotubes grown on the side oriented toward the separator. In specific embodiments, each carbon fiber electrode is an activated carbon fiber electrode.

In one embodiment, each carbon fiber electrode comprises a plurality of carbon nanotubes. Such nanotubes may be oriented vertically on the carbon fiber electrode. The density and height of the carbon nanotubes ranges between low and high densities/heights. The carbon fiber may comprise any suitable weave. Exemplary weave includes but is not limited to traditional, biaxial, triaxial, and the like. Such triaxial weave may be lighter than the biaxial weave.

In another embodiment of the disclosure, each carbon fiber electrode of the capacitor comprises a current collector layer.

In yet another embodiment of the disclosure, the current collector layer contains copper, aluminum, silver, or any highly conductive, low resistance material. In certain embodiments, the current collector layer contains at least one of copper, aluminum, and silver. In particular embodiment, the current collector layer is a copper or aluminum layer.

In certain embodiments, the separator layer of the capacitor allows ionic flow and inhibits electron flow between the electrodes. In particular embodiment, the separator layer is a filter paper, a tissue paper, or a microporous monolayer poly(propylene) membrane. In other particular embodiments, the separator layer is a microporous monolayer poly(propylene) membrane.

In certain embodiments, separator layer of the capacitor is Celgard 2500 or Celgard 3501. In other embodiments, the separator layer is Celgard 3501.

In certain embodiments, the capacitor disclosed herein may be at least partially enclosed with a coating. At least partially enclosing the capacitor with the coating may help increase the leakage resistance of the capacitor.

In certain embodiments, the capacitor may be substantially entirely enclosed with the coating. In such an embodiment, substantially the entire external surface of the capacitor, but for electrical leads coupled to the electrodes, may be enclosed.

In certain embodiments, the coating may be a film coating. Such a film coating may be a resin. Alternatively, the film coating may be one or more laminate sheets. In such an embodiment, the film coating may be a "thin" film coating that is less than or equal to approximately one millimeter in thickness. Exemplary thickness of the "thin" film coating may be between about 0.01 mm to about 1 mm, about 0.05 mm to about 1 mm, about 0.1 mm to about 1 mm, about 0.2 mm to about 1 mm, about 0.3 mm to about 1 mm, about 0.4 mm to about 1 mm, about 0.5 mm to about 1 mm, about 0.6 mm to about 1 mm, about 0.7 mm to about 1 mm, about 0.8 mm to about 1 mm, about 0.9 mm to about 1 mm, about 0.01 mm to about 0.9 mm, about 0.05 mm to about 0.9 mm, about 0.1 mm to about 0.9 mm, about 0.2 mm to about 0.9 mm, about 0.3 mm to about 0.9 mm, about 0.4 mm to about 0.9 mm, about 0.5 mm to about 0.9 mm, about 0.6 mm to about 0.9 mm, about 0.7 mm to about 0.9 mm, about 0.8 mm to about 0.9 mm, about 0.01 mm to about 0.5 mm, about 0.05 mm to about 0.5 mm, about 0.1 mm to about 0.5 mm, about 0.01 mm to about 0.6 mm, about 0.05 mm to about 0.6 mm, about 0.1 mm to about 0.6 mm, about 0.01 mm to about 0.7 mm, about 0.05 mm to about 0.7 mm, or about 0.1 mm to about 0.7 mm, or about 0.1 mm, or about 0.2 mm, or about 0.3 mm, or about 0.4 mm, or about 0.5 mm, or about 0.6 mm, or about 0.7 mm, or about 0.8 mm, or about 0.9 mm, or about 1 mm.

In certain embodiments, the coating may include an insulating polymer. Examples of insulating polymers include polyamide (e.g., nylon), polyethylene, polypropylene, and various polyesters, among other examples. Alternatively, the coating may include a polar polymer such as an epoxy resin, among other examples. The coating may include other materials as well.

In another aspect, the disclosure provides methods for preparing a capacitor comprising assembling a stack comprising a first carbon fiber electrode, a second carbon fiber electrode, a prepolymer composition as described in any of the above embodiments, and a separator layer, wherein the separator layer is disposed between the first carbon fiber electrode and second carbon fiber electrode, and wherein the prepolymer composition is disposed between the first carbon fiber electrode and the separator layer, and the prepolymer composition is disposed between the second carbon fiber electrode and the separator layer; and compressing the stack.

In one embodiment, the stack comprising of two or more of the capacitors as described above is assembled prior to compressing. Optionally, an insulating resin together with a sheet of glass fiber may be applied between the positive electrode of one capacitor and the negative electrode of another capacitor. In addition of providing more charge storage capacity, the stack of two or more of the capacitors may provide to higher mechanical load carrying capacity for the capacitor material.

In one embodiment of the method for preparing a capacitor, the compressing either of the stacks referred above is at a temperature between about 20° C. and about 100° C., or between about 30° C. and about 100° C., between about 40° C. and about 100° C., between about 50° C. and about 100° C., between about 60° C. and about 100° C., between about 70° C. and about 100° C., between about 80° C. and about 100° C., between about 90° C. and about 100° C., between about 20° C. and about 90° C., or between about 30° C. and about 90° C., between about 40° C. and about 90° C., between about 50° C. and about 90° C., between about 60° C. and about 90° C., between about 70° C. and about 90° C., between about 80° C. and about 90° C., between about 20° C. and about 80° C., or between about 30° C. and about 80° C., between about 40° C. and about 80° C., between about 50° C. and about 80° C., between about 60° C. and about 80° C., between about 70° C. and about 80° C., between about 20° C. and about 70° C., or between about 30° C. and about 70° C., between about 40° C. and about 70° C., between about 50° C. and about 70° C., between about 60° C. and about 70° C., between about 20° C. and about 60° C., or between about 30° C. and about 60° C., between about 40° C. and about 60° C., or between about 50° C. and about 60° C., or about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In one embodiment of the method for preparing a capacitor, the compressing either of the stacks referred above is at pressure between 0.5 MPa and 4.5 MPa, between 0.5 MPa and 4 MPa, between 0.5 MPa and 3.5 MPa, between 0.5 MPa and 3 MPa, between 0.5 MPa and 2.5 MPa, between 0.5 MPa and 2 MPa, between 0.5 MPa and 1.5 MPa, between 0.5 MPa and 1 MPa, 1 MPa and 4.5 MPa, between 1 MPa and 4 MPa, between 1 MPa and 3.5 MPa, between 1 MPa and 3 MPa, between 1 MPa and 2.5 MPa, between 1 MPa and 2 MPa, between 1 MPa and 1.5 MPa, 1.5 MPa and 4.5 MPa, between 1.5 MPa and 4 MPa, between 1.5 MPa and 3.5 MPa, between 1.5 MPa and 3 MPa, between 1.5 MPa and 2.5 MPa, between 1.5 MPa and 2 MPa, 2 MPa and 4.5 MPa, between 2 MPa and 4 MPa, between 2 MPa and 3.5 MPa, between 2 MPa and 3 MPa, between 2 MPa and 2.5 MPa, 2.5 MPa and 4.5 MPa, between 2.5 MPa and 4 MPa, between 2.5 MPa and 3.5 MPa, or between 2.5 MPa and 3 MPa, or about 0.5 MPa, about 1 MPa, about 1.5 MPa, about 2 MPa, about 2.5 MPa, about 3 MPa, about 3.5 MPa, about 4 MPa, or about 4.5 MPa.

In one embodiment of the method for preparing a capacitor, the compressing either of the stacks referred above is at vacuum pressures between 0.5 and 2 atm, between 1 and 2 atm, between 1.5 and 2 atm, between 0.5 and 1.5 atm, between 1 and 1.5 atm, or about 0.5 atm, about 1 atm, about 1.5 atm, or about 2 atm.

The compression may involve two separate pressures, one is the vacuum pressure that is used to remove air bubbles from the layup, for example, at a pressure of less than 1 atm (e.g., between 0.3 and 0.9 atmospheres). The second pressure is the compressional pressure under which the curing occurs, which may occur, for example, at a pressure between about 1 MPa and about 300 MPa. The pressures may be applied for a period of time suitable to assemble the stack, for example, each pressure may be applied for between about 1 minute and 16 hours or between about 30 minutes and 16 hours).

In one embodiment, the method for preparing a capacitor is wherein the first carbon fiber electrode and the second carbon fiber electrode are soaked in the prepolymer composition prior to assembly of the stack.

In one embodiment, the method for preparing a capacitor uses three dimensional printing. In an exemplary, non-limiting embodiment a current collector sheet may be first bonded to a triaxial carbon fiber weave, creating the electrodes and current collectors, followed by a 3-D printing technique to print epoxy in a honeycomb-like structure on the exposed triaxial carbon fiber weave. The cavities existent in the honeycomb are filled with electrolyte, which could be gel or solid like. The structural strength may come from the honeycomb epoxy structure. Then, two electrodes with the honeycomb structure may be assembled with a separator in between. The height of the honeycomb will vary between several tens and several hundreds of nanometers. In addition to an increase in charge storage capacity, an increase in mechanical load carrying capacity may also occur due to the honeycomb structure.

In another aspect, the disclosure provides methods for preparing a solid polymer electrolyte comprising adding to a composition comprising a solvent, an ion salt selected from the group consisting of a lithium, a magnesium, and an ammonium salt, and a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof, a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof; and heating the composition.

In one embodiment, the method for preparing the solid polymer electrolyte of the disclosure is wherein the bis-epoxide is selected from the group consisting of poly (ethylene glycol) bisglycidyl ether, resorcinol diglycidyl ether, polydimethyl siloxane bisglycidyl ether, and mixtures thereof.

In certain embodiments of the disclosure, the method is wherein the bis-epoxide is poly(ethylene glycol) bisglycidyl ether and one or more bis-epoxides selected from the group consisting of resorcinol diglycidyl ether, polydimethyl siloxane bisglycidyl ether, and mixtures thereof.

In particular embodiments, the method of the disclosure as described above is wherein the bis-epoxide is poly (ethylene glycol) bisglycidyl ether and resorcinol diglycidyl ether. In certain embodiments, the poly(ethylene glycol) bisglycidyl ether and resorcinol diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or about 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the method of the disclosure as described above is wherein the bis-epoxide is poly (ethylene glycol) bisglycidyl ether and polydimethyl siloxane bisglycidyl ether. In certain embodiments, the poly (ethylene glycol) bisglycidyl ether and polydimethyl siloxane bisglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or about 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the method of the disclosure as described above is wherein the bis-epoxide is poly (ethylene glycol) bisglycidyl ether and bisphenol A diglycidyl ether. In certain embodiments, the poly(ethylene glycol) bisglycidyl ether and bisphenol A diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or about 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the method of the disclosure as described above is wherein the poly(ethylene glycol) bisglycidyl ether has a number-averaged molecular weight ($M_n$) of about 100 g/mol to about 1000 g/mol; or about 300 g/mol to about 1000 g/mol; or about 300 g/mol to about 700 g/mol; or about 400 g/mol to about 600 g/mol; or about 500 g/mol to about 550 g/mol.

In other embodiments, the method of the disclosure as described above is wherein the ion salt is the lithium salt. In another embodiment, the lithium salt is lithium bromide, lithium chloride, and lithium iodide, lithium hexafluoroarsenate(V), lithium hexafluorophosphate, lithium bis(trifluoromethyl sulfonyl)imide, lithium borohydride, lithium dihydrogenphosphate, lithium tetrafluoroborate, lithium metaborate, lithium perchlorate, lithium thiophenolate, and lithium trifluoromethanesulfonate, or a mixture thereof. In particular embodiments, the lithium salt is lithium bis(trifluoromethyl sulfonyl)imide. In other embodiments, the lithium salt is present at a concentration of about 0.01 M to about 2.0 M; or about 0.1 M to about 1.5 M or about 0.1 M to about 1.0 M; or about 0.5 M to about 2.0 M; or about 0.5 M to about 1.5M; or about 0.5 M to about 1.0 M; or about 0.75 M to about 1.25 M.

In particular embodiments of the method of the disclosure as described above, the cross-linker comprises (i) 4,4'-methylenebiscyclohexaneamine and (ii) triethylenetetramine, tris(2-aminoethyl)amine, ethylenediamine, or a mixture thereof. In other particular embodiments, the cross-linker is 4,4'-methylenebiscyclohexaneamine and triethylenetetramine. In other particular embodiments, the cross-linker is 4,4'-methylenebiscyclohexaneamine and tris(2-aminoethyl)amine. In other particular embodiments, the cross-linker is 4,4'-methylenebiscyclohexaneamine and ethylenediamine.

In particular embodiments of the method of the disclosure as described above, the cross-linker comprises 4,4'-methylenebiscyclohexaneamine.

In certain embodiments, the method of the disclosure as described above is wherein the solvent is dimethyl carbonate, diethyl carbonate, propylene carbonate, ethylene carbonate, vinylene carbonate, methyl ethyl carbonate, dipropyl carbonate, butylene carbonate, dibutyl carbonate or a mixture thereof. In other embodiments, the solvent is propylene carbonate.

In certain embodiments, the method of the disclosure as described above embodiments is where the solution further comprises a second polymer as described above.

In particular embodiments of the method of the disclosure as described above, preparing the solid polymer electrolyte comprises mixing the solvent, thelithium salt, and the bis-epoxide by sonication. In an exemplary, non-limiting embodiment, the method comprises sonicating the solvent, the lithium salt, and the bis-epoxide; adding the cross-linker to obtain the composition; sonicating the composition; and heating the composition.

EXAMPLES

Materials and Fabrication

Structural supercapacitors were fabricated using 3 k carbon fiber (2×2 twill) for electrodes, copper mesh as current collectors, Grade 1 and Q2 filter paper, glass microfiber, Celgard 3501 and 2500 as separator, together with several formulations of solid polymer electrolyte (SPE) as matrix. Each separator tested had different porosity and thickness, and, except for the glass microfiber and Celgard separators, they were all cellulose based. The Celgard separators used in this study have a monolayer polypropylene base. Unlike in a dielectric capacitor, in this case, the thickness of the separator is not critical for achieving high capacitance as the charges are stored at the SPE-electrode interfaces. However, from an energy density standpoint, the thinner and stronger the separator, the better the overall energy density of the structural EDLC.

Several SPE formulations have been tested. These SPEs combined a poly(ethylene glycol) diglycidyl ether (PEGDGE) (average $M_n$ 526) base with a lithium salt ($Li(NSO_2CF_3)_2$, also abbreviated as LiIm) dissolved in propylene carbonate (PC) and curing agents (including Amicure PACM), 4,4'-methylenebiscyclohexanamine, and triethylenetetramine (TETA)). Bisphenol A diglycidyl ether (BPADGE) or resorcinol diglycidyl ether (RESDGE) were also used along with PEGDGE in block copolymer formulations to improve stiffness. One additional formulation was a polymer blend, the components of which are proprietary, and is referred to herein as SPE with PB. All of the SPEs were prepared by first dissolving the Li salt in PC (and the polymer blend component in that formulation). Then the PEGDGE and any BPADGE or RESDGE was added to the salt solution and sonicated until homogeneous. Finally, the curing agent was added immediately prior to layup of the EDLCs.

SPE formulations were also prepared with addition of solid particles, such as carbon nanotubes and alumina nanoparticles.

A process similar to that of composite materials layup has been followed for the structural EDLC fabrication. The supercapacitors were assembled in a picture frame mold, with SPE being applied to each additional layer, in the following order: copper terminal, carbon fiber electrode, separator, carbon fiber electrode, copper terminal. The assembled picture frame mold, connected to a vacuum pump, was then placed in an autoclave-style heated press to cure the EDLCs.

Electrical Characterization

Capacitance Measurement

Figure 2A:
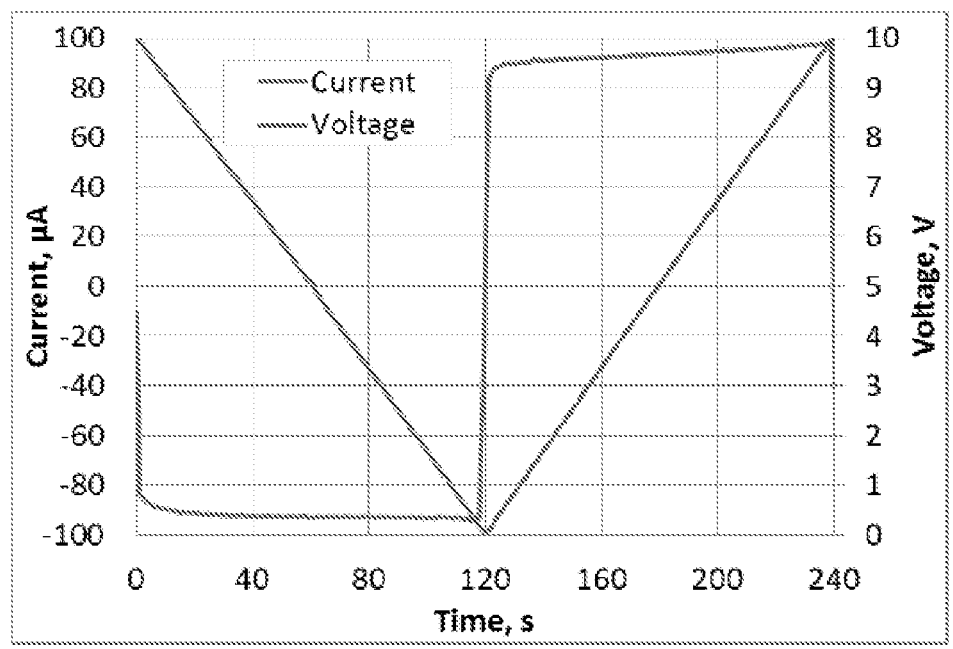
FIG. 2A shows current and voltage for the full charge-discharge cycle of a 1 mF "ideal" capacitor at a rate of 83.3 mV/sec.
Figure 2B:
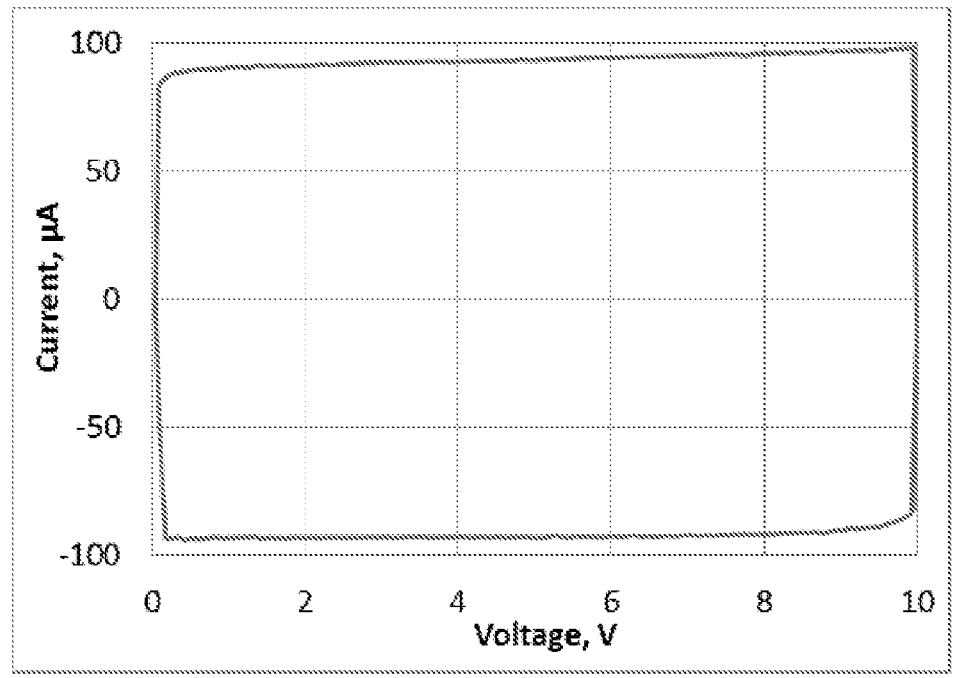
FIG. 2B shows cyclic voltammeter (CV) of the "ideal" capacitor.

Capacitance measurement was performed using cyclic voltammetry (CV). The method consists in the application of a constant positive current during the charging phase of the capacitor, and of a constant negative current during the discharge phase, while simultaneously measuring the voltage across the capacitor. If "an ideal" capacitor is measured, the charging—discharging should result in a linear variation of the voltage, as shown in FIG. 2A; plotting current against voltage results in the CV curve shown in FIG. 2B.

Figure 3A:
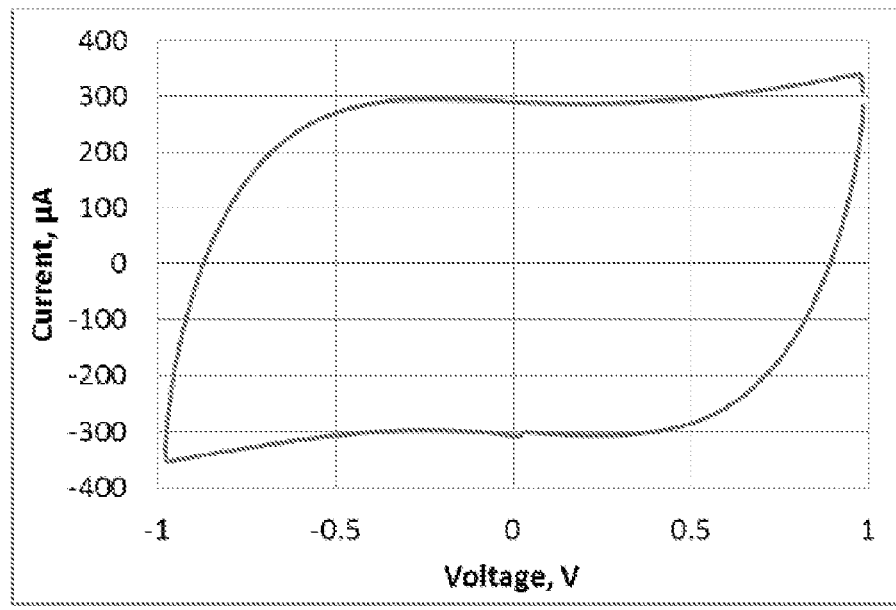
FIG. 3A shows CV for a 60 mF factory EDLC charged between −1V to 1V at a rate of 8.33 mV/s.
Figure 3B:
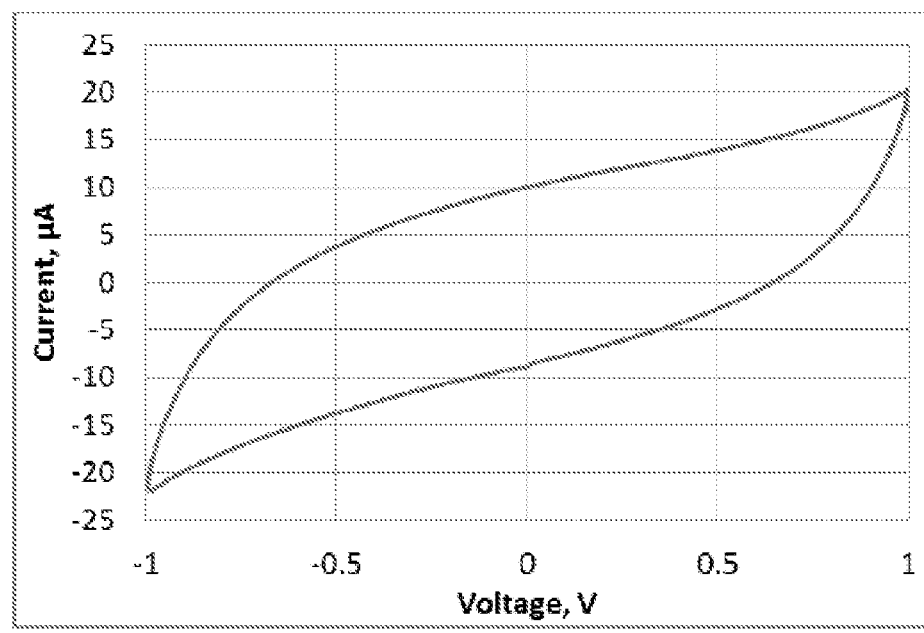
FIG. 3B shows CV for a structural EDLC with Celgard 3501 separator, charged between −1 and 1V at a rate of 8.33 mV/s.

The CV curve may be used to make qualitative inferences on the magnitude of the leakage resistance and ESR of the capacitor. Cyclic voltammetry curves for a factory EDLC and for one of the structural EDLCs are shown in FIGS. 3A and 3B, respectively. High ESR will tend to make the top left and bottom right corners rounded (FIG. 3A), while low leakage resistance will tend to skew the graph vertically (FIG. 3B). Qualitatively speaking, these CV's indicate that both EDLCs have fairly high ESR and that the structural EDLC has significant leakage, i.e. low leakage resistance.

In order to calculate capacitance, as the ratio between the applied constant current and the change in voltage over time (i.e., the slope of the voltage curve), the amount of current that is charging the capacitor is measured. Due to the highly nonlinear nature of the CV as can be seen in FIGS. 3A and 3B, the point at which the current is measured can affect drastically the capacitance calculations. Also, note that at the top-right corner of the graph, the majority of the current is being leaked out rather than charging the capacitor. Therefore, one way to mitigate this is to measure the current when the voltage across the capacitor is 0. When the voltage across the capacitor is zero, the leakage current is zero as well, meaning that no current is leaking out at this point. Accordingly, using the current at zero voltage for capacitance calculations will eliminate the leakage effect.

Leakage Resistance Evaluation

Figure 4:
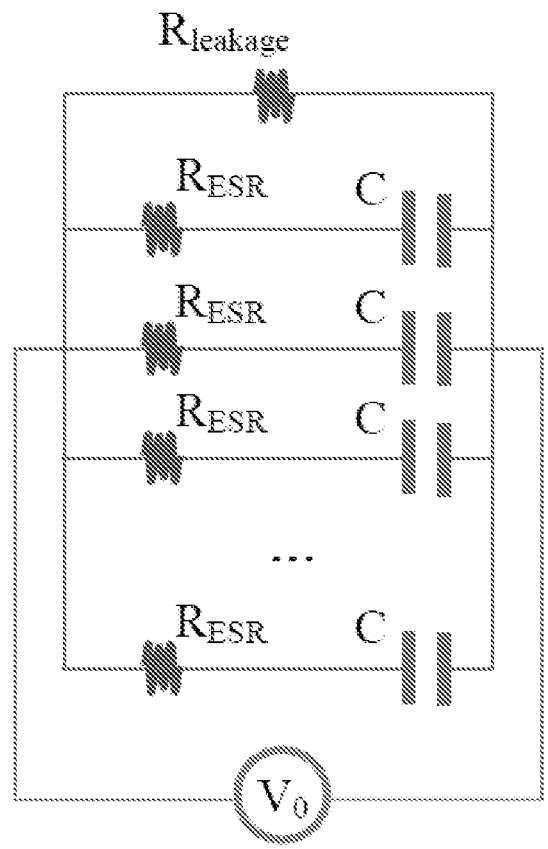
FIG. 4 illustrates electrical diagram of a typical EDLC.
Figure 5:
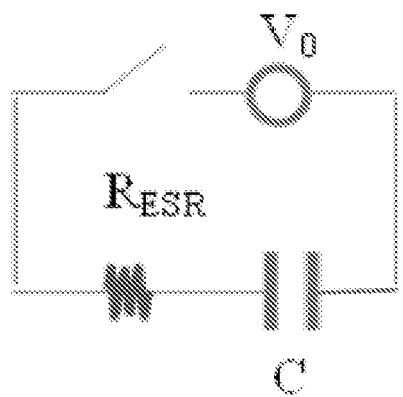
FIG. 5 illustrates a single branch of an EDLC with an applied step voltage.

To measure leakage resistance, the voltage across the capacitor (which includes capacitive as well as resistive elements as shown in FIG. 4) is held constant, and then the current required to keep that voltage constant is measured. For example, if an EDLC is initially discharged and a constant voltage of $V_0$ is applied instantly, the voltage across the capacitor is the sum of the voltage across the ESR and that across the capacitor (FIG. 5). In one branch of the capacitor (FIG. 5), the voltage across the capacitor is initially 0 because the capacitor is assumed to be fully discharged; then, the voltage comes from the ESR, which draws a current from the power source. The amount of current drawn by the ESR is calculated as $i=V_0/R_{ESR}$ according to Ohm's law. This current then charges the capacitor, increasing the voltage across it. As this happens, the voltage across the ESR decreases by an equal amount, keeping the total voltage across the branch equal to $V_0$. Eventually, the voltage across ESR goes to zero and that across the capacitor goes to $V_0$. Once this happens, no current travels through this branch.

However, in the branch containing the leakage resistance, there are no capacitive elements (see FIG. 4). Thus, the voltage across the leakage resistance is equal to $V_0$ at all times. Once the other branches (with capacitive elements) have been fully charged, they do not draw any more current from the power supply. Then, the EDLC will still require a current to stay charged to the same voltage, and all of this current will be travelling through the branch having only resistive elements. The resistance of these resistive elements, which is leakage resistance, can be determined easily by holding the voltage constant and measuring the amount of current required to maintaining this level of charge. The voltage to current ratio gives the leakage resistance of the EDLC. It can take days for the capacitor to fully charge, the charging duration affecting the leakage resistance evaluation as the EDLCs can have branches with very high ESR. In this example, capacitors were charged with a constant voltage for an average of 12 hours.

Mechanical Characterization

Tensile tests were performed to evaluate the ultimate tensile strength and modulus of elasticity for the power storage composite and for a composite made with the same type of carbon fiber weave and West System 105 epoxy, instead of SPE. Also, no separator was included in the latter. The tests were performed on material coupons with the cross section approximately 7.5 mm$^2$ (i.e., 15 mm wide and approximately 0.5 mm thick). FR4 tabs, with tapered edges (according to ASTM D 3039), were attached to the ends of the composite coupons to avoid material damage during gripping of the specimens/coupons. All tests were carried out until catastrophic failure occurred.

Three point bending tests were also performed. These tests provided insight onto the flexural stiffness and strength of the powers storage composites as well as on the delamination resistance and flexural failure modes of the material. A modified version of ASTM D 790 was used to determine the flexural properties of the power storage composites as well as the standard composite materials.

Results

Figure 6:
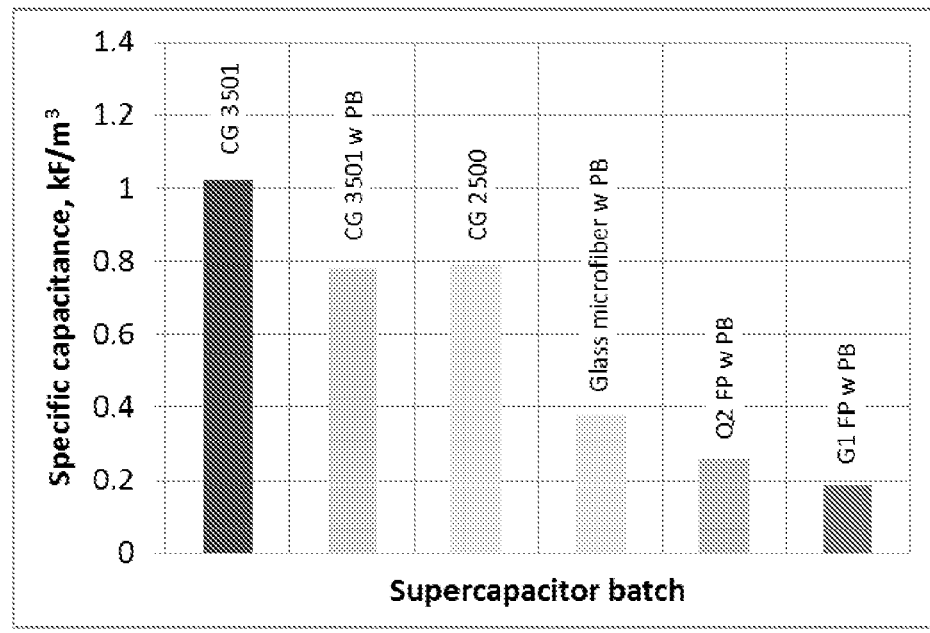
FIG. 6 shows the effect of separator material on the specific capacitance at a Li salt concentration of 95 micromoles of salt per gram of poly(ethylene glycol) diglycidyl ether (PEGDGE).
Figure 7:
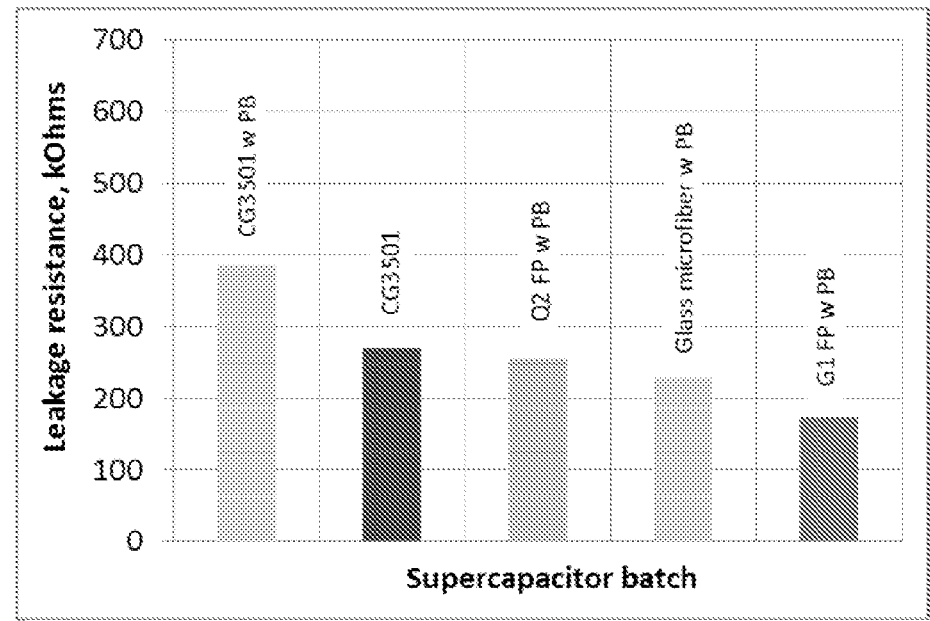
FIG. 7 shows the effect of separator material on leakage resistance at a Li salt concentration of 95 micromoles of salt per gram of PEGDGE.

Structural EDLCs have been manufactured with different types of separators and with two distinct SPE formulations. The SPE was formulated with and without a polymer blend, identified in the subsequent plots as PB. The amount of LiIm used in the SPE formulation was varied to evaluate its effect on capacitance and leakage resistance. Experimental data for all types of separator materials has been acquired for the SPE with a salt amount of 0.75 g which corresponds to approximately 95 micromoles of Li salt per grams of PEGDGE. From this data, summarized in FIGS. 6 and 7, and from the summary of the mechanical tests, was concluded that Celgard 3501 is the best separator material for the structural supercapacitor. FIG. 6 shows that Celgard 2500 is also a good choice for the separator material; but, during three point bending tests, delamination has been observed, hence this separator was not used in subsequent batches. FIG. 6 also indicates that structural supercapacitors made with regular SPE and Celgard 3501 exhibited highest capacitance per unit volume, while the supercapacitors made with SPE with PB and Celgard 3501 recorded slightly lower capacitance per unit volume.

Figure 8:
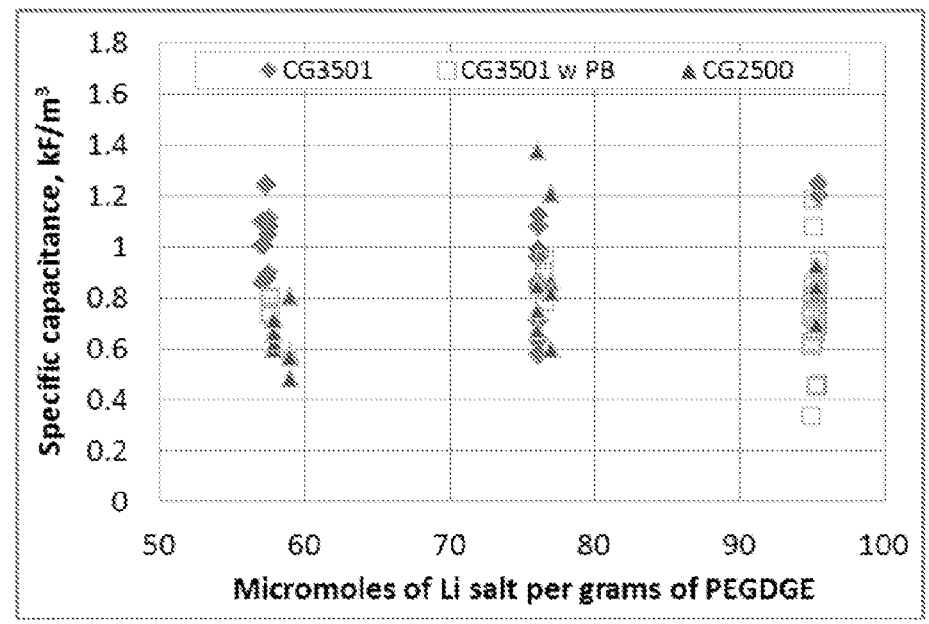
FIG. 8 shows the effect of Li salt concentration, solid polymer electrolyte (SPE) formulation, and type of Celgard separator on specific capacitance.
Figure 9:
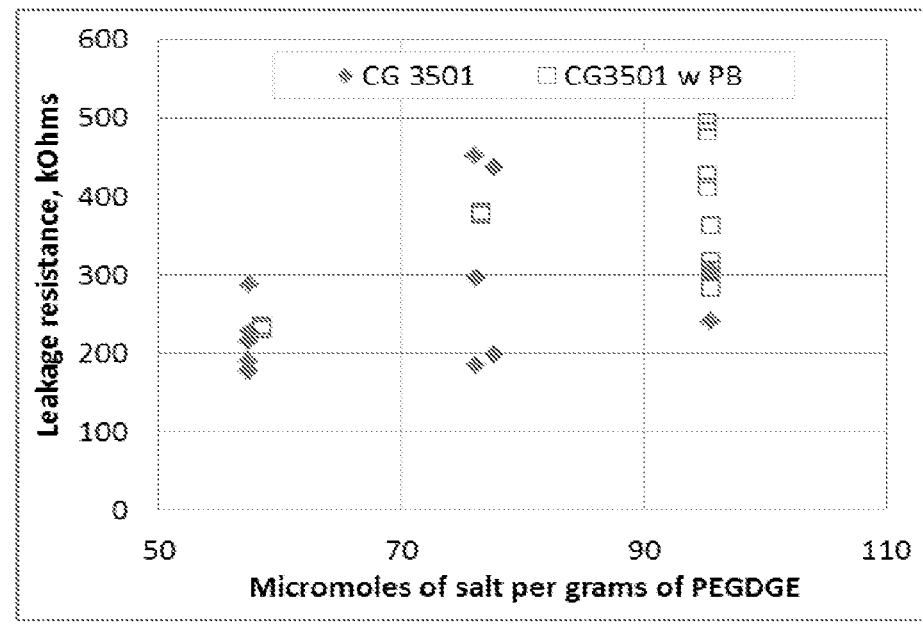
FIG. 9 shows the effect of Li salt concentration and SPE formulation on leakage resistance, for structural EDLCs made with Celgard 3501.

This outcome may suggest that the PB added to the regular leads to a somewhat lower capacitance for the supercapacitors. However, from the leakage resistance plot in FIG. 7, it appears that the PB increases the leakage resistance, which is a desirable outcome. Data plotted in FIG. 8 suggests that the specific capacitance tends to increase with the amount of Li salt used in the SPE formulation when the separator material is Celgard 2500. Because of the observed failure modes associated with Celgard 2500, this separator material was not used in subsequent batches. Same data (FIG. 8) seems to indicate that when Celgard 3501 is used as separator material, the specific capacitance gets slightly lower with the increase in the amount of Li salt. This may only be due to the scatter in the data.

The Li salt content did not have a significant effect on the overall mechanical properties of the structural supercapacitor based on the results gathered during the tests performed for mechanical characterization. The results reported in Table 1 represent average values of the ultimate strength and modulus of elasticity as determined from tests performed on specimens coupons made with SPEs with different Li salt concentrations. In tension, the power storage composites have 69% of the standard composite stiffness and 58% of the standard composite strength. The addition of the PB does not have a significant effect (less than 2%) on the power storage composites tensile properties.

TABLE 1

Summary of the mechanical properties for the power storage composite and a regular composite material

| | Modulus of elasticity (GPa) | Ultimate tensile strength (MPa) | Flexural modulus of elasticity (GPa) | Flexural strength (MPa) |
|---|---|---|---|---|
| Regular single layer composite | 27.4 | 794 | 32.1 | 280 |
| Power storage composite w/o PB | 18.9 | 466 | 18.1 | 93 |
| Power storage composite w/ PB | 18.7 | 456 | 12.2 | 87 |

Figure 10:
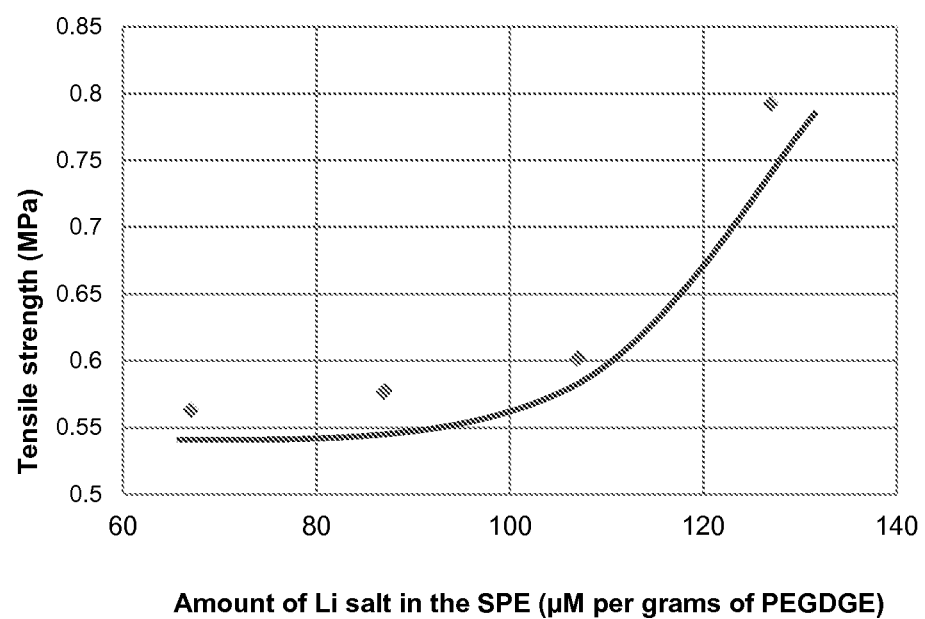
FIG. 10 shows the effect of Li salt concentration on the mechanical strength of the SPE.

Preliminary measurements of the tensile strength of the SPE, as a function of the amount of Li salt, are reported in FIG. 10. The data suggests that an increase in the amount of Li salt leads to an increase in the tensile stregth of the SPE.

When considering the flexural properties of the standard and power storage composites without PB, the power storage composite has only 56% of the standard composite stiffness and 33% of the standard composite strength. The addition of PB to the SPE is detrimental to the flexural stiffness of the power storage composite, which is measured to be about 67% that of the composite w/o PB. However, the PB has very little effect on the material flexural strength.

The disclosures of all articles and references mentioned in this application, including patents, are incorporated herein by reference in their entirety.

It is understood that the examples and embodiments described herein are for illustrative purposes only. Unless clearly excluded by the context, all embodiments disclosed for one aspect of the invention can be combined with embodiments disclosed for other aspects of the invention, in any suitable combination. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. All publications, patents, and patent applications cited herein are hereby incorporated herein by reference for all purposes.

We claim:

1. A solid polymer electrolyte comprising a polymer and an ion salt, wherein the polymer is an epoxy comprising
    a bis-epoxide selected from the group consisting of poly (ethylene glycol) bisglycidyl ether, bisphenol A diglycidyl ether, resorcinol diglycidyl ether, polydimethyl siloxane bisglycidyl ether, and mixtures thereof, and
    a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof; and
    wherein the ion salt is a lithium, a magnesium, or an ammonium salt.

2. The solid polymer electrolyte of claim 1, wherein the bis-epoxide is selected from the group consisting of poly (ethylene glycol) bisglycidyl ether, resorcinol diglycidyl ether, polydimethyl siloxane bisglycidyl ether, bisphenol A diglycidyl ether, and mixtures thereof.

3. The solid polymer electrolyte of claim 1, wherein the ion salt is the lithium salt.

4. The solid polymer electrolyte of claim 1, wherein the cross-linker comprises (i) 4,4'-methylenebiscyclohexaneamine and (ii) triethylenetetramine, tris(2-aminoethyl)amine, ethylenediamine, or a mixture thereof.

5. A capacitor comprising a first carbon fiber electrode, a second carbon fiber electrode, a solid polymer electrolyte of claim 1, and a separator layer, wherein
    the separator layer is disposed between the first carbon fiber electrode and second carbon fiber electrode,
    the solid polymer electrolyte is disposed between the first carbon fiber electrode and the separator layer, and
    the solid polymer electrolyte is disposed between the second carbon fiber electrode and the separator layer.

6. The capacitor of claim 5, wherein each carbon fiber electrode either is an activated carbon fiber electrode or has carbon nanotubes grown on the side oriented toward the separator.

7. The capacitor of claim 5, wherein each carbon fiber electrode comprises a current collector layer.

8. The capacitor of claim 7, wherein the current collector layer contains at least one of copper, aluminum, and silver.

9. The capacitor of claim 5, wherein the separator layer is a filter paper, a tissue paper, Celgard 2500, or Celgard 3501.

10. The capacitor of claim 5, wherein the capacitor is at least partially enclosed with a coating.

11. The capacitor of claim 10, wherein the coating comprises at least one of nylon, polyethylene, polypropylene, polyester, and an epoxy resin.

12. A prepolymer composition comprising:

an ion salt selected from the group consisting of a lithium, a magnesium, and an ammonium salt, a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof, a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof; and a solvent.

13. A method for preparing a capacitor comprising assembling a stack comprising a first carbon fiber electrode, a second carbon fiber electrode, a prepolymer composition of claim 12, and a separator layer, wherein the separator layer is disposed between the first carbon fiber electrode and second carbon fiber electrode, and wherein the prepolymer composition is disposed between the first carbon fiber electrode and the separator layer, and the prepolymer composition is disposed between the second carbon fiber electrode and the separator layer;

and compressing the stacks.

14. The method according to claim 13, wherein compressing the stacks is at a temperature between about 20° C. and about 100° C., at pressures between 0.5 MPa and 4.5 MPa, and at vacuum pressures between 0.5 and 2 atm.

15. The method of claim 13, wherein the first carbon fiber electrode and the second carbon fiber electrode are soaked in the prepolymer composition prior to assembly of the stack.

16. A method for preparing a solid polymer electrolyte comprising adding to a composition comprising a solvent, an ion salt selected from the group consisting of a lithium, a magnesium, and an ammonium salt, and a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof, a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof;

and heating the composition.

* * * * *